US012578014B2

(12) United States Patent
Allard et al.

(10) Patent No.: US 12,578,014 B2
(45) Date of Patent: Mar. 17, 2026

(54) SYSTEM AND METHOD FOR AUTOMATED APPLY CLUTCH SWITCHING TO ALLOW FOR REDUCED CLUTCH ADAPTION TIME

(71) Applicant: FCA US LLC, Auburn Hills, MI (US)

(72) Inventors: Corey Allard, Auburn Hills, MI (US); Steven Christ, Auburn Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 20 days.

(21) Appl. No.: 18/819,293

(22) Filed: Aug. 29, 2024

(65) Prior Publication Data

US 2026/0063201 A1 Mar. 5, 2026

(51) Int. Cl.
*F16H 61/02* (2006.01)
*G01M 13/022* (2019.01)
*B60W 20/30* (2016.01)
*F16H 61/00* (2006.01)

(52) U.S. Cl.
CPC ...... *F16H 61/0265* (2013.01); *G01M 13/022* (2013.01); *B60W 20/30* (2013.01); *F16H 2061/0053* (2013.01); *F16H 2061/0068* (2013.01); *F16H 2061/0087* (2013.01)

(58) Field of Classification Search
CPC ......... F16H 61/0265; F16H 2061/0053; F16H 2061/0068; F16H 2061/0087; B60W 20/30; G01M 13/02; G01M 13/022
See application file for complete search history.

(56) References Cited

U.S. PATENT DOCUMENTS 10,260,576 B2 * 4/2019 Saliga ................... F16D 25/062

FOREIGN PATENT DOCUMENTS

CN 107741542 B * 2/2020 ........... G01R 31/006
CN 110953335 A * 4/2020 ............. F16H 61/06

* cited by examiner

*Primary Examiner* — Tisha D Lewis
(74) *Attorney, Agent, or Firm* — Jeremy J. Klobucar

(57) ABSTRACT
A transmission adaptive control system that establishes transmission clutch adaptive values for a vehicle includes a transmission and a controller. The transmission has a plurality of clutches including a first clutch, a second clutch, a third clutch, a fourth clutch and a fifth clutch, wherein clutches of the plurality of clutches actuate between open and closed positions resulting in the transmission shifting between available gears including first gear, second gear, third gear, fourth gear, fifth gear, neutral and reverse. The controller controls actuation of the plurality of clutches to establish adaptive values for all clutches of the plurality of clutches.

16 Claims, 4 Drawing Sheets

190

| Gear | Ratio | A C1278R | B C1_5R | C C13567 | D C4_8R | E C23468 |
|---|---|---|---|---|---|---|
| 1 | 5,500 | ● | ● | ● | | |
| 2 | 3,520 | ● | ● | | | ● |
| 3 | 2,200 | | ● | ● | | ● |
| 4 | 1,720 | | ● | | ● | ● |
| 5 | 1,301 | | ● | ● | ● | |
| 6 | 1,000 | | | ● | ● | ● |
| 7 | 0,833 | ● | | ● | ● | |
| 8 | 0,640 | ● | | | ● | ● |
| N | 0,000 | ● | ● | | | |
| R | -4,543 | ● | ● | | ● | |

- N(BC) -> D1 (A learn)
- N(AC) -> D1 (B learn)
- N(AB) -> D1 (C learn)
- N(AB) -> D2 (E learn)
- N(AB) -> R (D learn)

*FIG. 2*

SYSTEM AND METHOD FOR AUTOMATED APPLY CLUTCH SWITCHING TO ALLOW FOR REDUCED CLUTCH ADAPTION TIME

FIELD

The present application generally relates to establishing transmission clutch adaptive values and storing them into a transmission controller.

BACKGROUND

Vehicles with shifting transmissions typically include clutches that engage and disengage to allow shifting between various gears. In general, a minimum pressure needs to be reached for a given clutch to engage for a gear shift to initiate. Due to variations in transmission builds, it is desirable to learn these pressures, time adaptions and clutch tolerances on every clutch prior to delivery of a vehicle to a customer as to improve green shift quality. Current solutions are complicated and can require additional cycle time at the end of vehicle build. Accordingly, while such techniques for establishing transmission clutch adaptive values can work well for their intended purpose, there is a desire for improvement in the relevant art.

SUMMARY

According to one example aspect of the invention, a transmission adaptive control system that establishes transmission clutch adaptive values for a vehicle includes a transmission and a controller. The transmission has a plurality of clutches including a first clutch, a second clutch, a third clutch, a fourth clutch and a fifth clutch, wherein clutches of the plurality of clutches actuate between open and closed positions resulting in the transmission shifting between available gears including first gear, second gear, third gear, fourth gear, fifth gear, neutral and reverse. The controller controls actuation of the plurality of clutches. The controller is configured to: command a first shift of the transmission from neutral to the first gear while engaging the second and third clutch; learn a first adaptive value for the first clutch based on the first shift; command a second shift of the transmission from neutral to the first gear while engaging the first and third clutch; learn a second adaptive value for the second clutch based on the second shift; command a third shift of the transmission from neutral to the first gear while engaging the first and second clutch; learn a third adaptive value for the third clutch based on the third shift; command a fourth shift of the transmission from neutral to the second gear while engaging the first and second clutch; learn an adaptive value for the fifth clutch based on the fourth shift; command a fifth shift of the transmission from neutral to reverse while engaging the first and second clutch; and learn an adaptive value for the fourth clutch based on the fifth shift.

In some implementations, the controller is configured to: determine whether an end of line tester has been initiated; and command the first shift based on a determination that the end of line tester has been initiated.

In some implementations, the controller is configured to: determine whether a dealer service learn has been initiated; and command the first shift based on a determination that a dealer service learn has been initiated.

In some implementations, the first adaptive value comprises an apply pressure for the first clutch.

In some implementations, the second adaptive value comprises an apply pressure for the second clutch.

In additional aspects, the third adaptive value comprises an apply pressure for the third clutch.

In additional features, control controls actuation of the clutches while the vehicle is stationary.

In examples, the vehicle comprises a hybrid electric vehicle.

According to one example aspect of the invention, a method for implementing a transmission adaptive control system that establishes transmission clutch adaptive values for a transmission of a vehicle is provided. The transmission has a plurality of clutches including a first clutch, a second clutch, a third clutch, a fourth clutch and a fifth clutch, wherein clutches of the plurality of clutches actuate between open and closed positions resulting in the transmission shifting between available gears including first gear, second gear, third gear, fourth gear, fifth gear, neutral and reverse. The method includes: commanding, at a controller, a first shift of the transmission from neutral to the first gear while engaging the second and third clutch; learning, at the controller, a first adaptive value for the first clutch based on the first shift; commanding, at the controller, a second shift of the transmission from neutral to the first gear while engaging the first and third clutch; learning, at the controller, a second adaptive value for the second clutch based on the second shift; commanding, at the controller, a third shift of the transmission from neutral to the first gear while engaging the first and second clutch; learning, at the controller, a third adaptive value for the third clutch based on the third shift; commanding, at the controller, a fourth shift of the transmission from neutral to the second gear while engaging the first and second clutch; learning, at the controller, an adaptive value for the fifth clutch based on the fourth shift; commanding, at the controller, a fifth shift of the transmission from neutral to reverse while engaging the first and second clutch; and learning, at the controller, an adaptive value for the fourth clutch based on the fifth shift.

In other features, the method includes: determining, at the controller, whether an end of line tester has been initiated; and commanding, at the controller, the first shift based on a determination that the end of line tester has been initiated.

According to other features, the method includes: determining, at the controller, whether a dealer service learn has been initiated; and commanding, at the controller, the first shift based on a determination that a dealer service learn has been initiated.

In other features of the method, the first adaptive value comprises an apply pressure for the first clutch.

According to additional features of the method, the second adaptive value comprises an apply pressure for the second clutch.

In other aspects of the method, the third adaptive value comprises an apply pressure for the third clutch.

In additional features, the method includes actuating the clutches while the vehicle is stationary.

In additional examples of the method, the vehicle is a hybrid electric vehicle.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

BRIEF DESCRIPTION OF THE DRAWINGS

FIG. 2 is a table illustrating various clutch apply scenarios for shifting to exemplary gears 1-8, neutral and reverse, wherein the transmission adaptive control system can shift from neutral to first gear, neutral to second gear, and neutral to reverse to learn clutch apply values for all of the clutches A-E according to various principles of the present application;

DESCRIPTION

As discussed above, vehicles with clutch shifting transmissions include clutches that engage and disengage to allow shifting between various gears. In general, a minimum apply pressure needs to be reached for a given clutch to engage for a gear shift to initiate. Due to variations in transmission builds, it is desirable to learn these pressures, time adaptions and clutch tolerances on every clutch, and on each vehicle, prior to delivery of a vehicle to a customer as to improve green shift quality. Current end of production line procedures involve an inaccurate adaption procedure to "rough-in" the clutch adaptions/tolerances (first prior art procedure) or a drive routine that takes place during a vehicle current drive portion of the end of line routine (second prior art procedure). The first prior art procedure requires precise engine control and can be difficult to calibrate due to engine performance differences and idle stability challenges while at an assembly plant. The second prior art procedure can be more accurate but typically requires unwanted cycle time to complete.

The instant disclosure provides a transmission adaptive control system and related method for establishing transmission clutch adaptive values. In examples, the method for establishing the transmission clutch adaptive values can be accomplished in a staging area of an assembly plant, or at a dealer prior to customer delivery, thus removing the cycle time impact from the assembly plant. Further, the methods described herein can be completed concurrently with other vehicle tasks during normal end of line checks, while the vehicle remains static, therefore not adding additional timing requirements. Moreover, the methods described herein can be used for a dealer or service routine to perform a quick adaption routine in the event a vehicle owner complaint or transmission replacement.

Figure 1:
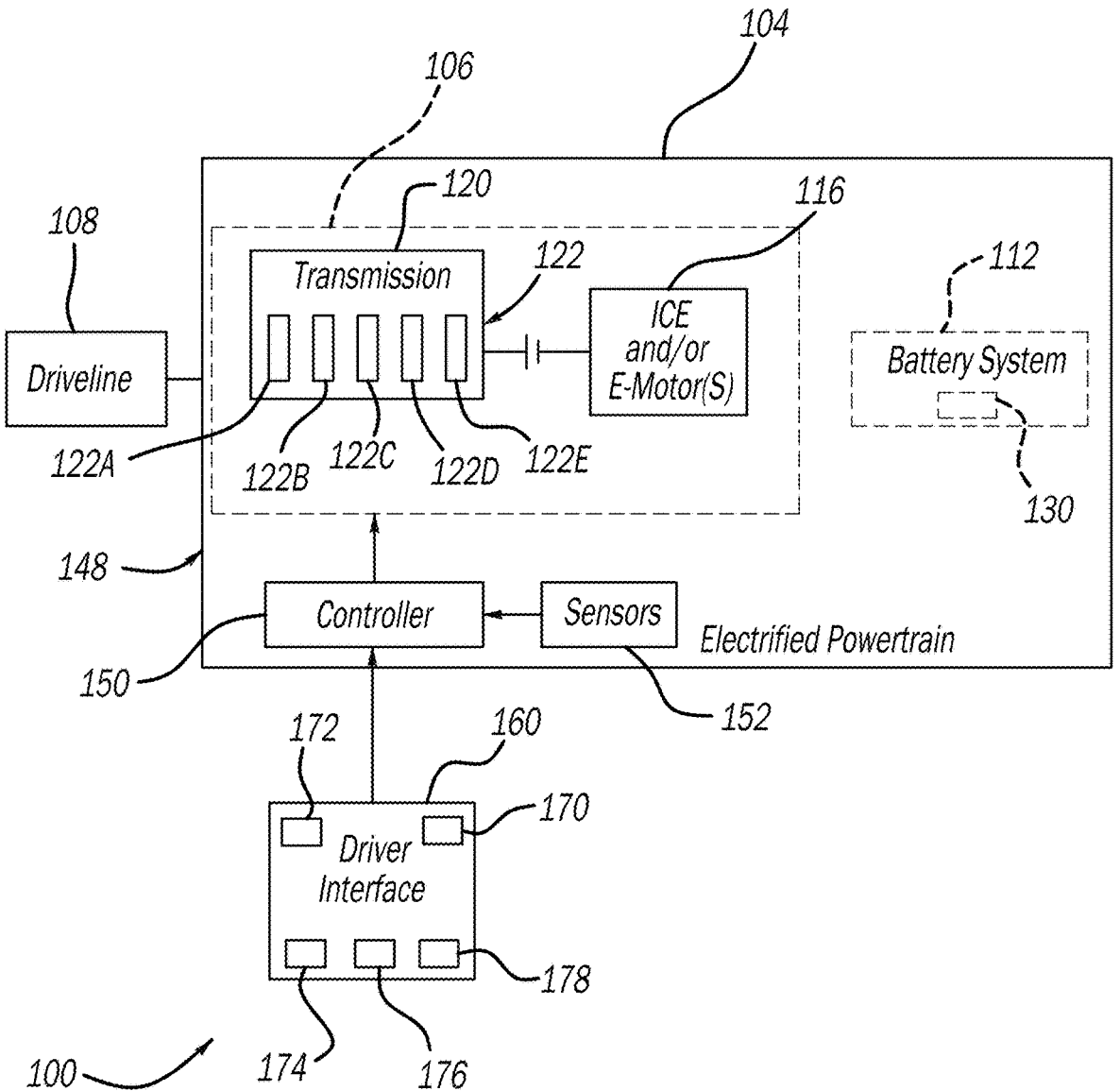
FIG. 1 is a functional block diagram of a vehicle having a shifting transmission that incorporates a transmission adaptive control system according to various principles of the present application.

Referring now to FIG. 1, a functional block diagram of an exemplary vehicle 100 according to the principles of the present application is illustrated. The vehicle 100 includes a powertrain 104 having a drive module 106 configured to generate and transfer drive torque to a driveline 108 for vehicle propulsion. The drive module 106 generally includes a prime mover 116 such as an internal combustion engine (ICE) and/or electric traction motors.

A transmission 120 includes various clutches collectively identified at 122 and individually identified at 122A, 122B, 122C, 122D and 122E. The clutches cooperatively move between various states of open (disengaged) and closed (engaged) to shift the transmission between various drive gears as will be described in detail herein. For electrified powertrains that include one or more electrified motors, a high voltage battery system 112 is provided for powering the electric motor(s). The battery system 112 includes at least one battery pack assembly 130.

A control system 148 for implementing the transmission adaptive techniques according to the present disclosure includes a controller 150 that provides various inputs to the drive module 106 such as clutch engage and disengage commands. In additional examples, the controller 150 can provide commands to the drive module 106 based on inputs from sensors 152 and vehicle operating conditions.

The electrified vehicle 100 further includes a driver interface 160. The driver interface 160 includes a steering wheel 170 and a brake pedal 172. The driver interface 160 includes a driver input device, e.g., an accelerator pedal 174, for providing a driver input, e.g., a torque request, for the prime mover 116. The driver interface 170 can further include a park brake 176. The driver interface 160 or vehicle interior also includes a transmission shift request device, such as a shift lever or rotary shifter 178, for the driver to request a desired gear of the transmission 120. The shift lever or rotary shifter 178 can provide conventional transmission options including park, reverse, neutral, drive and low.

With continued reference to FIG. 1 and additional reference to FIG. 2, additional features of the instant disclosure will be described. FIG. 2 shows a table 190 illustrating various clutch apply scenarios for shifting to exemplary gears 1-8, neutral and reverse. The transmission adaptive control system 148 can shift from neutral to first gear, neutral to second gear, and neutral to reverse to learn clutch apply values for all of the clutches A-E according to various principles of the present application.

An exemplary apply sequence will now be described. As mentioned above, the apply sequence can be implemented while the vehicle is stationary (e.g., garage shifts). Adaptive values for clutch A, 122A can be learned by engaging clutches B, 122B and C, 122C while shifting from neutral to drive (first gear drive). Adaptive values for clutch B, 122B can be learned by engaging clutches A, 122A and C, 122C while shifting from neutral to drive (first gear drive). Adaptive values for clutch C, 122C can be learned by engaging clutches A, 122A and B, 122B while shifting from neutral to drive (first gear drive). Adaptive values for clutch E, 122E can be learned by engaging clutches A, 122A and B, 122B while shifting from neutral to drive (second gear drive). Adaptive values for clutch D, 122D can be learned by engaging clutches A, 122A and B, 122B while shifting from neutral to reverse.

By learning, the transmission adaptive control system 148 learns a minimum pressure necessary to start to engage a given clutch. In a clutch, pressure is applied to move a piston to close one or more clutch plates together to a closed position (the clutch plates are precluded from relative rotation). The amount of pressure needed to move the clutch to a closed position is dependent upon a number of factors such as, but not limited to, spring compression requirements (including a return spring). Because of tolerances, every vehicle may not have the same pressure requirements off the assembly line (end of build). As such, the transmission adaptive techniques can learn the preferred pressures and establish them for implementation during vehicle use. Similarly, due to wear, the pressures requirements may change over time leading to the desire to update the adaptive values during a service procedure visit.

Figure 3:
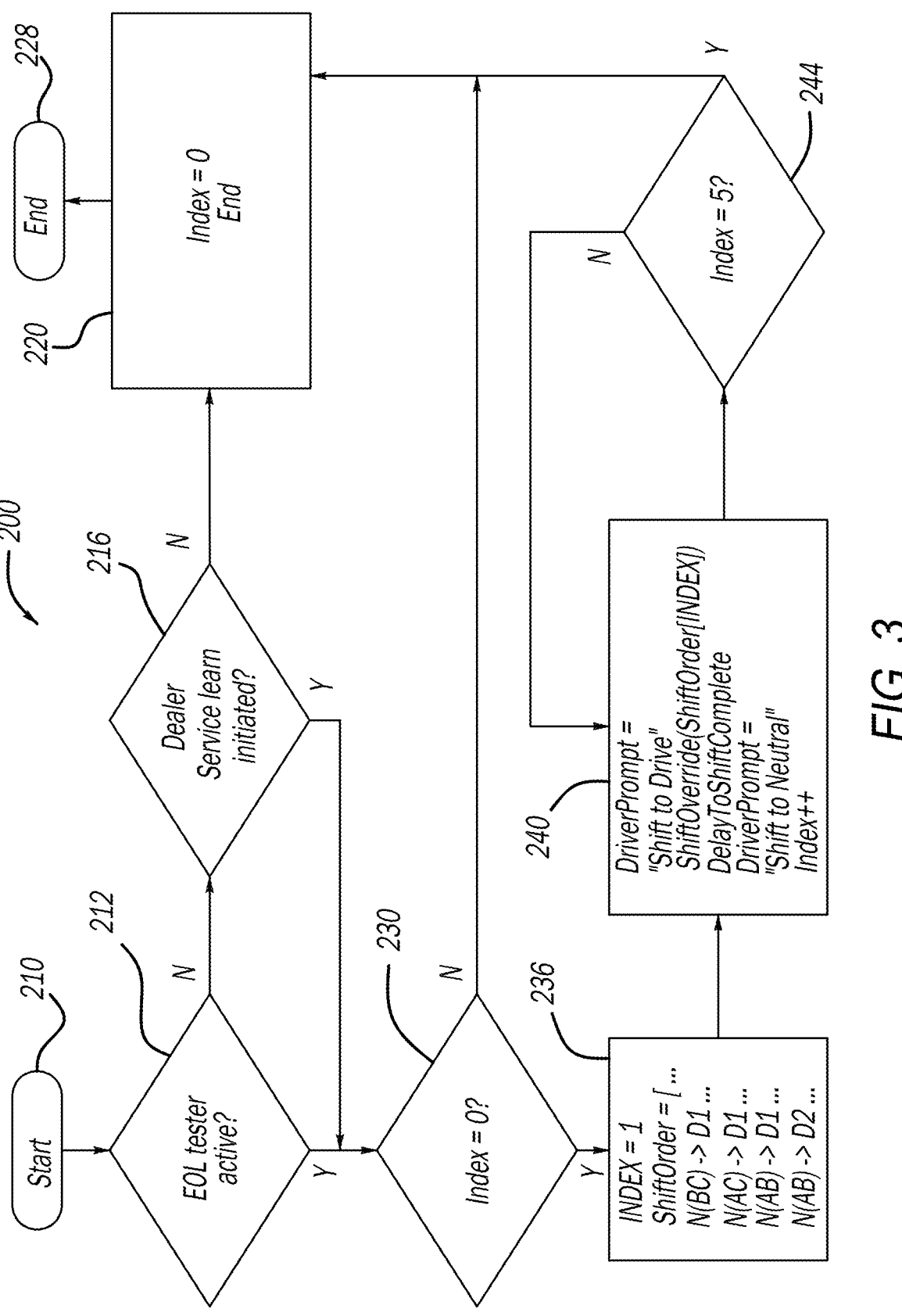
FIG. 3 is a flow chart showing an exemplary method of implementing the transmission adaptive control system during an end of line (EOL) and service procedure event according to various principles of the present application.

With additional reference now to FIG. 3, a method of implementing the transmission adaptive control system 148 during an end of line (EOL) and service procedure event according to various principles of the present application is shown and generally identified at reference numeral 200. The method starts at 210. At 212 control determines whether the end of line testier is active. If control determines that the end of line tester is not active at 212, control determines whether a dealer service learn has been initiated at 216. If control determines that a dealer service learn has not been initiated at 216, control sets an index to zero at 220 and ends at 228. If control determines that the end of line tester is active at 212 or the dealer service learn has been initiated at 216, control determines whether the index is zero at 230. If control determines that the index is not zero at 230, control sets the index to zero at 220 and ends at 228. If control determines that the index is zero at 230, control performs the series of shifts at 336 described above with respect to the table 190 shown in FIG. 2. The series of shifts learns the preferred pressures for the clutches and establishes them for implementation during vehicle use. At 240, control commands a user to cycle between desired gears (e.g., such as by shifting shifter 178 at the driver interface 160). At 244, control determines whether the index is five at 244. If control determines that the index is not five at 244, control loops to 240. If control determines that the index is five at 244, control sets the index to zero at 220 and ends at 228.

Figure 4:
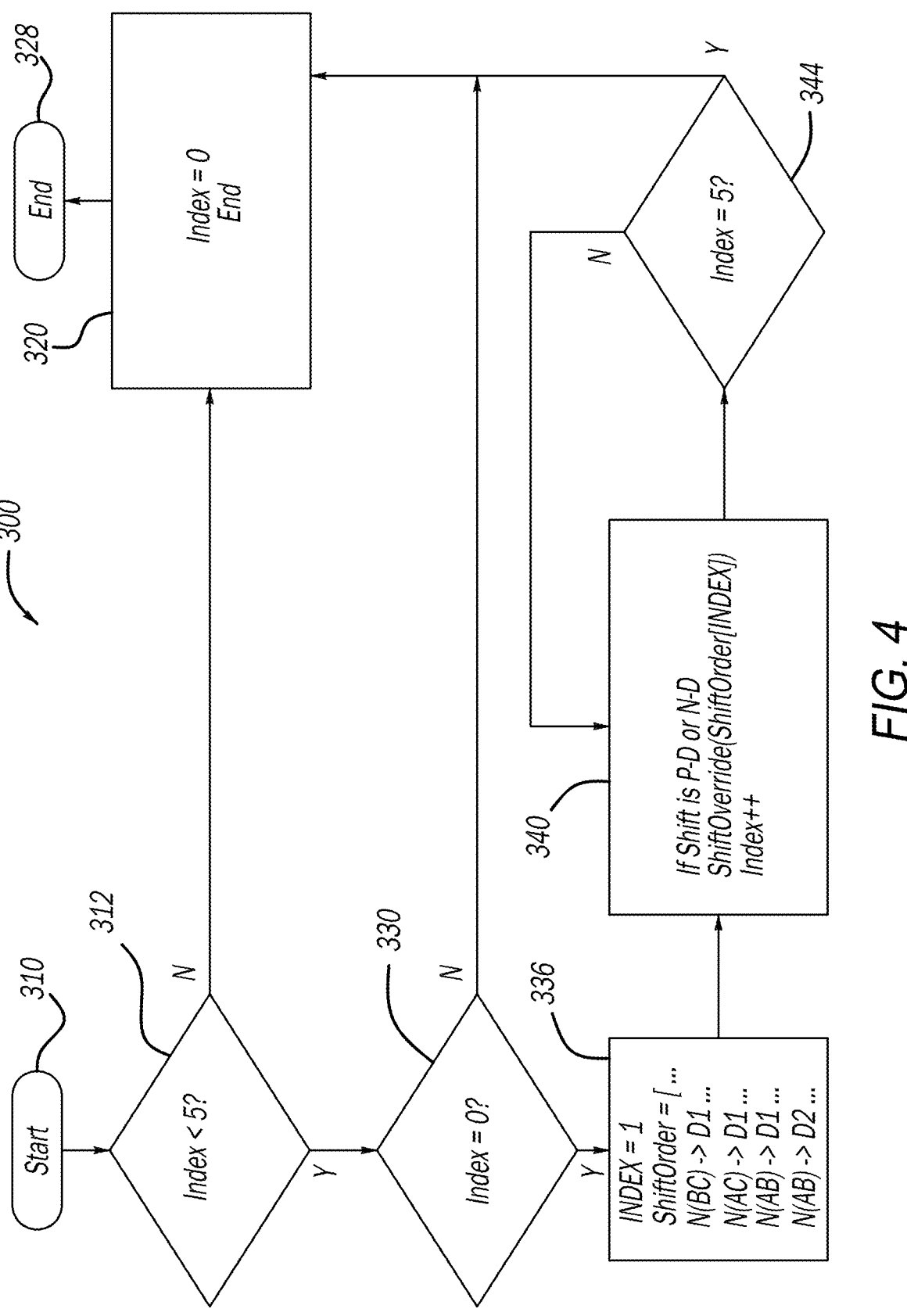
FIG. 4 is a flow chart showing an exemplary method of implementing the transmission adaptive control system during an in-field event according to various principles of the present application.

With additional reference now to FIG. 4, a method of implementing the transmission adaptive control system 148 during an in-field event according to various principles of the present application is shown and generally identified at reference numeral 300. The method starts at 310. At 312 control determines whether an index is less than five. If control determines that the index is not less than five, control sets the index to zero at 320 and ends at 328. If control determines that the index is less than five at 312, control determines whether the index is zero at 330. If control determines that the index is not less than zero at 330 control sets the index to zero at 320 and ends at 328. If control determines that the index is zero at 330, control performs the series of shifts at 336 described above with respect to the table 190 shown in FIG. 2. The series of shifts re-learns the preferred pressures for the clutches and establishes them for implementation for future vehicle use. At 340 control increases the index. At 344 control determines whether the index is five. If control determines the index is not five at 344, control loops to 340. If control determines that the index is five at 344, control sets the index to zero at 320 and ends at 328.

As used herein, the term controller or module refers to an application specific integrated circuit (ASIC), an electronic circuit, a processor (shared, dedicated, or group) and memory that executes one or more software or firmware programs, a combinational logic circuit, and/or other suitable components that provide the described functionality.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present application, its application or uses. Thus, variations that do not depart from the gist of the present application are intended to be within the scope of the present application.

What is claimed is:

1. A transmission adaptive control system that establishes transmission clutch adaptive values for a vehicle, the transmission adaptive control system comprising:
   a transmission having a plurality of clutches including a first clutch, a second clutch, a third clutch, a fourth clutch and a fifth clutch, wherein clutches of the plurality of clutches actuate between open and closed positions resulting in the transmission shifting between available gears including first gear, second gear, third gear, fourth gear, fifth gear, neutral and reverse; and
   a controller that controls actuation of the plurality of clutches, wherein the controller is configured to:
      command a first shift of the transmission from neutral to the first gear while engaging the second and third clutch;
      learn a first adaptive value for the first clutch based on the first shift;
      command a second shift of the transmission from neutral to the first gear while engaging the first and third clutch;
      learn a second adaptive value for the second clutch based on the second shift;
      command a third shift of the transmission from neutral to the first gear while engaging the first and second clutch;
      learn a third adaptive value for the third clutch based on the third shift;
      command a fourth shift of the transmission from neutral to the second gear while engaging the first and second clutch;
      learn an adaptive value for the fifth clutch based on the fourth shift;
      command a fifth shift of the transmission from neutral to reverse while engaging the first and second clutch; and
      learn an adaptive value for the fourth clutch based on the fifth shift.

2. The transmission adaptive control system of claim 1, wherein the controller is configured to:
   determine whether an end of line tester has been initiated; and
   command the first shift based on a determination that the end of line tester has been initiated.

3. The transmission adaptive control system of claim 1, wherein the controller is configured to:
   determine whether a dealer service learn has been initiated; and
   command the first shift based on a determination that a dealer service learn has been initiated.

4. The transmission adaptive control system of claim 1, wherein the first adaptive value comprises an apply pressure for the first clutch.

5. The transmission adaptive control system of claim 1, wherein the second adaptive value comprises an apply pressure for the second clutch.

6. The transmission adaptive control system of claim 1, wherein the third adaptive value comprises an apply pressure for the third clutch.

7. The transmission adaptive control system of claim 1, wherein the controller controls actuation of the clutches while the vehicle is stationary.

8. The transmission adaptive control system of claim 1, wherein the vehicle comprises a hybrid electric vehicle.

9. A method of implementing a transmission adaptive control system that establishes transmission clutch adaptive values for a transmission of a vehicle, the transmission having a plurality of clutches including a first clutch, a second clutch, a third clutch, a fourth clutch and a fifth clutch, wherein clutches of the plurality of clutches actuate between open and closed positions resulting in the transmission shifting between available gears including first gear, second gear, third gear, fourth gear, fifth gear, neutral and reverse, the method comprising:

commanding, at a controller, a first shift of the transmission from neutral to the first gear while engaging the second and third clutch;

learning, at the controller, a first adaptive value for the first clutch based on the first shift;

commanding, at the controller, a second shift of the transmission from neutral to the first gear while engaging the first and third clutch;

learning, at the controller, a second adaptive value for the second clutch based on the second shift;

commanding, at the controller, a third shift of the transmission from neutral to the first gear while engaging the first and second clutch;

learning, at the controller, a third adaptive value for the third clutch based on the third shift;

commanding, at the controller, a fourth shift of the transmission from neutral to the second gear while engaging the first and second clutch;

learning, at the controller, an adaptive value for the fifth clutch based on the fourth shift;

commanding, at the controller, a fifth shift of the transmission from neutral to reverse while engaging the first and second clutch; and learning, at the controller, an adaptive value for the fourth clutch based on the fifth shift.

10. The method of claim 9, further comprising:

determining, at the controller, whether an end of line tester has been initiated; and commanding, at the controller, the first shift based on a determination that the end of line tester has been initiated.

11. The method of claim 9, further comprising:

determining, at the controller, whether a dealer service learn has been initiated; and commanding, at the controller, the first shift based on a determination that a dealer service learn has been initiated.

12. The method of claim 9, wherein the first adaptive value comprises an apply pressure for the first clutch.

13. The method of claim 9, wherein the second adaptive value comprises an apply pressure for the second clutch.

14. The method of claim 9, wherein the third adaptive value comprises an apply pressure for the third clutch.

15. The method of claim 9, further comprising:

actuating the clutches while the vehicle is stationary.

16. The method of claim 9 wherein the vehicle comprises a hybrid electric vehicle.

* * * * *